J. P. GRAY.
AUTOMOBILE WIND DEFLECTOR.
APPLICATION FILED JUNE 1, 1921.
1,428,844.
Patented Sept. 12, 1922.
2 SHEETS—SHEET 1.
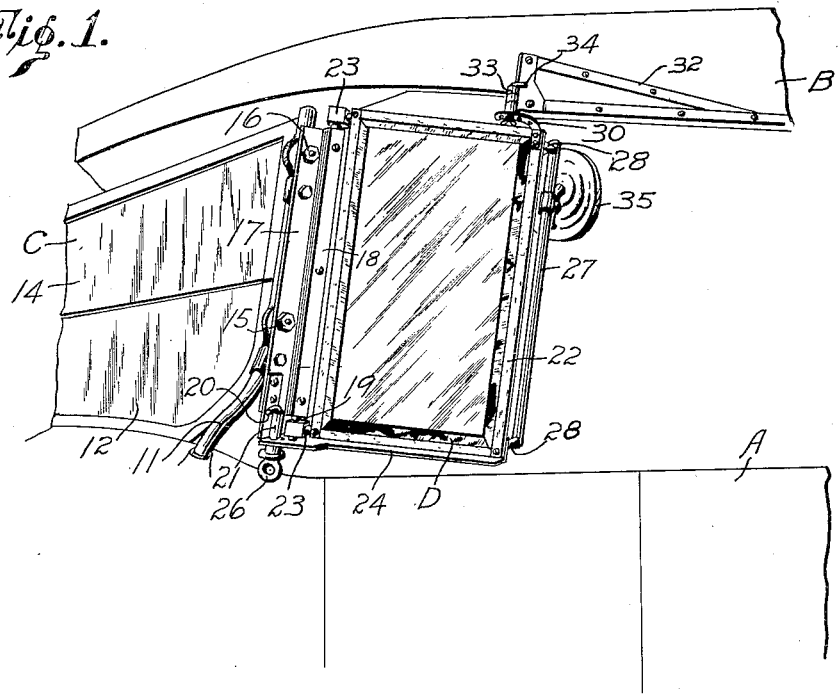
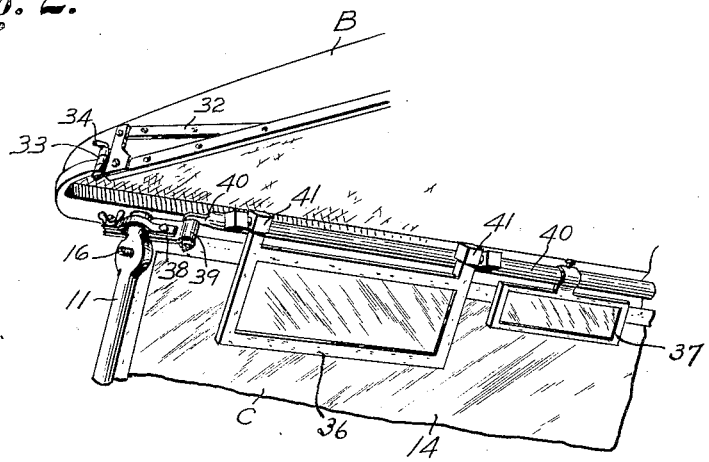
INVENTOR.
Joseph P. Gray
BY Nestall and Wallace
ATTORNEYS.

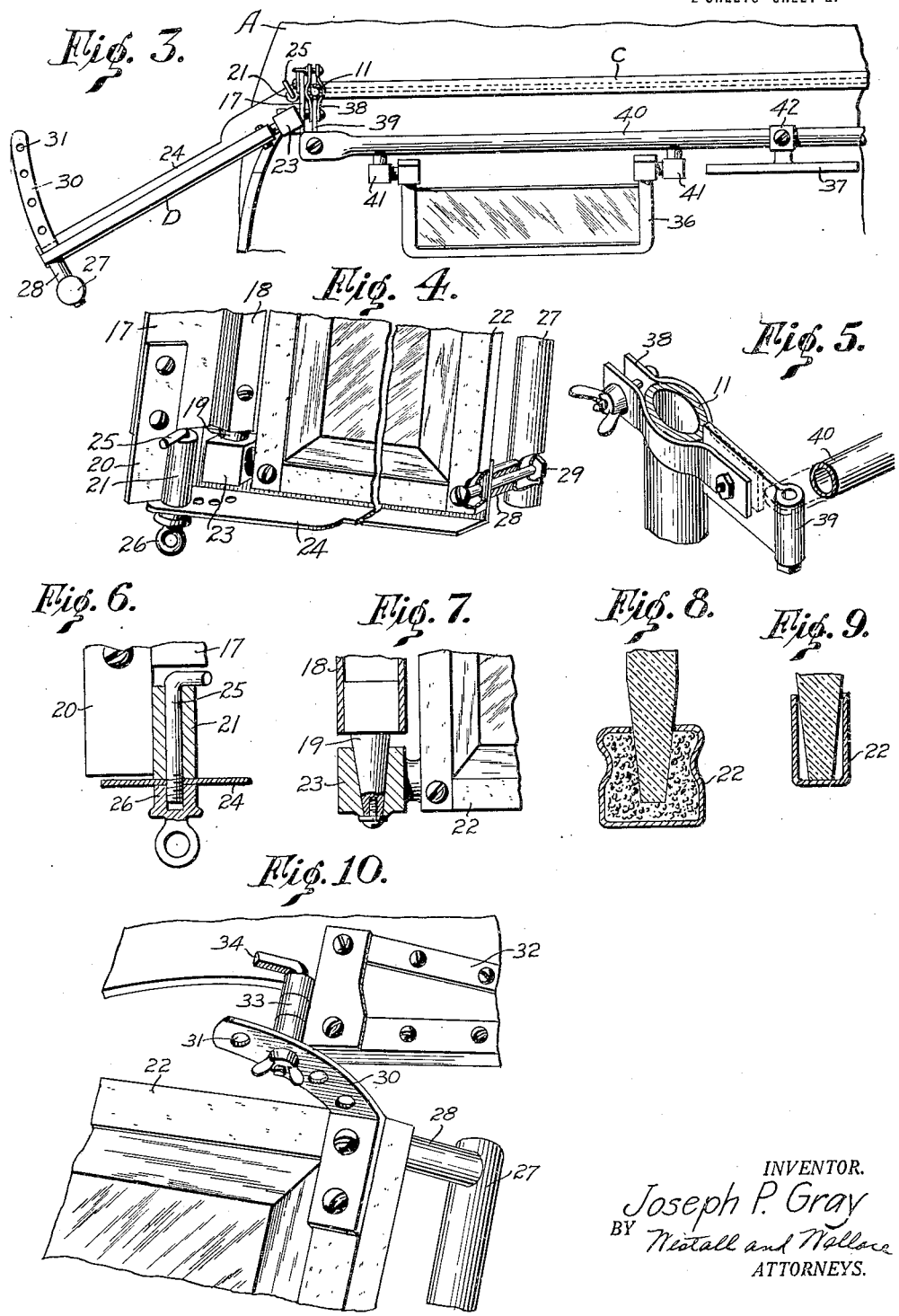

Patented Sept. 12, 1922.

1,428,844

UNITED STATES PATENT OFFICE.

JOSEPH P. GRAY, OF LOS ANGELES, CALIFORNIA.

AUTOMOBILE WIND DEFLECTOR.

Application filed June 1, 1921. Serial No. 474,125.

*To all whom it may concern:*

Be it known that I, JOSEPH P. GRAY, a citizen of the United States, and resident of Los Angeles, in the county of Los Angeles, State of California, have invented new and useful Improvements in an Automobile Wind Deflector, of which the following is a specification.

This invention relates to a front windshield and side wind deflector construction for automobiles.

It is common practice to attach to the windshield of an automobile, side wind deflectors which prevent the wind from flowing about the sides of the main windshield and creating a draft through the automobile body. These wind deflectors are commonly attached adjacent one edge, or by a supporting means equivalent to such a mounting. The result is that they are insecure, interfere with the entrance of the car occupants through the front door and are easily broken.

My invention contemplates a rigid mounting so arranged that it may also be used as an aid in getting into the car. To this end, I have formed a handle as a part of the mounting. In addition to the broader features of my invention, there are certain details of design, whereby an easily adjusted, detachable, simple and rigid construction is obtained.

These objects together with other objects and corresponding accomplishments are obtained by means of the embodiment of my invention illustrated in the accompanying drawings, in which:

Fig. 1 is a perspective view of a fragment of an automobile looking at a front corner, a wind deflector being in position; Fig. 2 is a perspective view from a different angle and showing the wind deflector detached; Fig. 3 is a plan view showing a fragment of the main windshield and wind deflector in position; Fig. 4 is a perspective view of the lower portion of the wind deflector and a mounting therefor; Fig. 5 is a perspective view of a bracket for holding the glare shields; Fig. 6 is a vertical section of the lower fastener for holding the wind deflector in adjusted position; Fig. 7 is a perspective view of the pivot joint by which the wind deflector is mounted; Fig. 8 is a cross section through a side of the frame holding the glass of the wind deflector; Fig. 9 is a cross section through the top part of the frame; and Fig. 10 is a perspective view showing a fragment of the wind deflector and the means for attaching it to the top of an automobile.

Referring more particularly to Figs. 1 and 2, the body of an automobile is indicated by A. Mounted upon the body in the usual manner is the top B. A windshield C of the ordinary construction is mounted upon the body, and attached thereto is a wind deflector D embodying my invention.

Referring more in detail to the windshield, it is mounted upon standards 11 secured to the body. The sections of the windshield glass with their frames are indicated by 12 and 14. These sections are mounted upon pintles 15 and 16 so that they may be adjusted. As this part of the construction forms no part of my invention, it is not necessary to further describe it.

There are two wind deflectors, one on each side of the windshield. These are the same in construction, except one is left handed and the other is right handed. A description of one will be sufficient. Mounted upon the standard 11 is a plate 17. This plate may be secured to the standard by means of the pintles 15 and 16 and by means of auxiliary bolts. The plate is provided with a channel 18 best shown in Figs. 1 and 4. Mounted in the ends of the channel are tapered pintles 19, best shown in Fig. 7. A bracket plate 20 is secured to the lower end of plate 17 and has secured thereto a socket 21 to receive a locking pin.

The glass of the wind deflector D is mounted in a channelled frame 22. This frame has at its sides channels packed with wicking to hold the glass against vibration, see Fig. 8.

The top and bottom of the frame do not require packing and are formed in the manner shown in Fig. 9. Secured to the side of the frame adjacent the upper and lower edges are bearings 23 to receive the pintles 19, and cap screws are provided to hold the pintles in position. Such construction provides ground-in joints so that the wind deflector may be swung into adjusted position and will be securely held in this position. Secured to the lower side of the frame is a plate 24 having openings, as shown in Fig. 6, to receive a locking pin 25 which may be passed through the socket 21. The pin is bent at the upper end and threaded at the lower, a nut 26 being mounted upon the pin. Secured to the other side of the frame is a handle. This handle comprises a tubular member 27 extending along the frame and spaced therefrom by tubular supports 28, through which bolts 29, best shown in Fig. 4, extend. Secured to the upper side of the frame is a bracket 30, see Figs. 1, 3, and 10. The bracket is of arcuate form and has a number of holes 31 spaced at suitable distances apart. Forming a part of the top is a frame 32 having a socket 33 to receive a locking pin 34. This pin is adapted to extend through a hole in bracket 30, the lower end thereof being threaded to receive a nut, so that the frame may be locked in adjusted position at the upper side. The handle 27 may also serve as a means to support a rear sight mirror 35.

The wind deflector may be adjusted as to its angular position and firmly fastened to the top of the machine by passing the pin 34 through a hole 31 in the bracket on the deflector frame. The pin 25 is passed through the corresponding hole in plate 24 at the lower side of the frame, thereby securely locking the wind deflector in position, the deflector being in such a rigid mounting that the handle 27 may be used in mounting and dismounting from the machine.

As an aid to the mounting of glare shields 36, shown in Fig. 3, and as a support for a rear sight mirror 37, split clamps 38 are mounted upon the standards. The clamps have secured thereto plates 39 provided with sockets, through which may be passed pins to secure a cross bar 40, spaced from and extending along the rear of the windshield. Ground-in joints 41 may be mounted upon the rod 40 and the glare shields 36 secured thereto, so that the glare shields may be raised or lowered in front of the vision of the operator or occupants of the machine and will remain in adjusted position. The rear sight mirror 37 may be secured to the rod by suitable means 42 as indicated in Figs. 2 and 3. Various other devices may be mounted upon the rod 40 as is found convenient.

My invention relates particularly to the wind deflector construction, and what I claim is:

1. In combination with an automobile having a windshield with supporting standards therefor, a support secured to one of said standards, a wind deflector secured to said support at one side by ground-in joints, a handle spaced from the free side of said deflector and secured thereto, an arcuate bracket secured at the upper edge of said deflector, said bracket having spaced holes therein, a frame secured to the automobile top and having a socket for registration with a hole, a detachable pin for insertion in said socket and one of said holes to lock the deflector in adjusted position, a plate on the lower edge of said deflector and having holes therein, and means adjacent the lower joint to lock said deflector in adjusted position.

2. In combination with an automobile having a windshield with supporting standards therefor, a support secured to one of said standards, a wind deflector secured to said support at one side by ground-in joints, a handle spaced from the free side of said deflector and secured thereto, an arcuate bracket secured at the upper edge of said deflector, said bracket having spaced holes therein, a frame secured to the automobile top and having a socket for registration with a hole, and a detachable pin for insertion in said socket and one of said holes to secure the deflector in adjusted position.

In witness that I claim the foregoing I have hereunto subscribed my name this 23rd day of May, 1921.

JOSEPH P. GRAY.